(12) United States Patent
Sung (10) Patent No.: US 7,719,954 B2
(45) Date of Patent: May 18, 2010

(54) APPARATUS AND METHOD FOR MEASURING NOISES IN A WIRELESS COMMUNICATION SYSTEM

(75) Inventor: Joon-Hyun Sung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 265 days.

(21) Appl. No.: 11/863,347

(22) Filed: Sep. 28, 2007

(65) Prior Publication Data

US 2008/0080362 A1   Apr. 3, 2008

(30) Foreign Application Priority Data

Sep. 29, 2006   (KR) .................... 10-2006-0096531

(51) Int. Cl.
*H04J 11/00* (2006.01)
(52) U.S. Cl. .................. 370/203; 370/208; 370/210
(58) Field of Classification Search ............. 370/203, 370/204, 206, 207, 208, 210
See application file for complete search history.

(56) References Cited

U.S. PATENT DOCUMENTS

| | | | | |
|---|---|---|---|---|
| 6,058,101 | A * | 5/2000 | Huang et al. | 370/208 |
| 7,372,910 | B2 * | 5/2008 | Suh et al. | 375/260 |
| 7,382,717 | B2 * | 6/2008 | Park | 370/203 |
| 2004/0114504 | A1 * | 6/2004 | Jung et al. | 370/203 |
| 2004/0228417 | A1 * | 11/2004 | Kennedy et al. | 375/260 |
| 2004/0266374 | A1 * | 12/2004 | Saed et al. | 455/134 |
| 2005/0085249 | A1 * | 4/2005 | Goldstein et al. | 455/502 |
| 2005/0201295 | A1 * | 9/2005 | Kim et al. | 370/241 |
| 2006/0246852 | A1 * | 11/2006 | Nakao | 455/101 |
| 2007/0092013 | A1 * | 4/2007 | Cahn et al. | 375/260 |
| 2008/0056220 | A1 * | 3/2008 | Yu et al. | 370/342 |
| 2008/0080598 | A1 * | 4/2008 | Mo et al. | 375/219 |

FOREIGN PATENT DOCUMENTS

| | | |
|---|---|---|
| JP | 2004-072724 | 3/2004 |
| KR | 1020030091084 A | 12/2003 |
| KR | 1020050038070 A | 5/2005 |

* cited by examiner

*Primary Examiner*—Chi H. Pham
*Assistant Examiner*—Kevin Mew
(74) *Attorney, Agent, or Firm*—Sughrue Mion, PLLC (57) ABSTRACT

An apparatus and method for measuring noise in a reception apparatus of a wireless communication system supporting Orthogonal Frequency Division Multiplexing (OFDM). The apparatus and method converts a preamble signal of a received OFDM frame into a frequency domain, and measures signal strength at each of subcarriers to which a null signal is allocated, from the preamble signal converted into the frequency domain. Further, the apparatus and method determines signal strength caused by noise depending on an average of signal strengths measured at the subcarriers. The preamble signal includes multiple subcarrier signals, and the subcarrier to which a null signal is allocated is a subcarrier over which no signal is transmitted by the transmission apparatus.

12 Claims, 7 Drawing Sheets

APPARATUS AND METHOD FOR MEASURING NOISES IN A WIRELESS COMMUNICATION SYSTEM

PRIORITY

This application claims the benefit under 35 U.S.C. §119 (a) of a Korean Patent Application filed in the Korean Intellectual Property Office on Sep. 29, 2006 and assigned Serial No. 2006-96531, the disclosure of which is incorporated herein by reference.

BACKGROUND OF THE INVENTION

1. Field of the Invention

The present invention relates generally to an apparatus and method for measuring the strength of the noises in a wireless communication system, and in particular, to an apparatus and method for measuring the strength of the noises in a reception apparatus of a wireless communication system supporting Orthogonal Frequency Division Multiplexing (OFDM).

2. Description of the Related Art

Generally, a transmission signal in the wireless environment, rather than in the wire environment, may suffer from considerable distortion due to various factors such as multipath, attenuation, time-varying noise, interference, etc. A fading phenomenon due to the multipath is closely related to the reflection on geographical structures or the movement of users, and a transmission signal that has experienced a fading channel is received at a reception apparatus after it is considerably distorted. This causes degradation of the entire system performance.

The fading phenomenon is the biggest obstacle to supporting high-speed data communication in the wireless environment. Therefore, to realize the high-speed data communication in the wireless environment, there is a need to minimize the loss in the wireless channel, such as fading and inter-user interference.

In the reception apparatus of the existing wireless communication system, various schemes are provided to measure the strength of the noises caused by the wireless channel, and remove the noises. In addition, the measured strength of the noises is used in such techniques as channel estimation, encoding and decoding, which are applied to the wireless communication system.

Therefore, for performance improvement of the techniques using the measured strength of the noises in the wireless communication system, there is a demand for a scheme capable of accurately measuring the strength of the noises from a received signal.

The reception apparatus of the existing wireless communication system performs an operation of estimating a channel gain from a received signal, and extracting a transmitted signal from the received signal considering the estimated channel gain. Therefore, the reception apparatus of the existing wireless communication system estimates noise components by removing the estimated channel gain and the transmitted signal to be extracted, from the received signal.

However, the noise component estimation method achieved in the reception apparatus of the existing wireless communication system may not accomplish accurate noise measurement not only due to an error occurring in estimation of the channel gain but also due to a low reliability of the extracted transmitted signal.

SUMMARY OF THE INVENTION

An aspect of the present invention is to address at least the problems and/or disadvantages and to provide at least the advantages described below. Accordingly, an aspect of the present invention is to provide an apparatus and method for measuring the strength of noise using a preamble signal transmitted over an Orthogonal Frequency Division Multiplexing (OFDM) frame or OFDMA frame used in an OFDM or OFDMA scheme.

Another aspect of the present invention is to provide an apparatus and method for measuring the strength of noise using a signal component received in a subcarrier over which no signal is transmitted by a transmission apparatus within a preamble transmitted over an OFDM frame or an OFDMA frame.

Another aspect of the present invention is to provide an apparatus and method for compensating for a frequency offset occurring within a preamble transmitted over an OFDM frame or an OFDMA frame, and measuring the strength of noise using the frequency offset-compensated preamble signal.

Another aspect of the present invention is to provide an apparatus and method for measuring the strength of noise in a frequency domain using a preamble signal transmitted over an OFDM frame or an OFDMA frame.

According to one aspect of the present invention, there is provided a method for measuring signal strength caused by noise in a reception apparatus of a wireless communication system supporting Orthogonal Frequency Division Multiplexing (OFDM). The noise strength measurement method includes receiving a time-domain preamble signal by means of an OFDM frame transmitted from a transmission apparatus; converting the time-domain preamble signal into a frequency-domain preamble signal through Fast Fourier Transform (FFT); measuring signal strength at each of subcarriers to which a null signal is allocated, from the frequency-domain preamble signal; and determining signal strength caused by noise depending on an average of signal strengths measured at the subcarriers. The preamble signal includes multiple subcarrier signals, and the subcarrier to which a null signal is allocated is a subcarrier over which no signal is transmitted by the transmission apparatus.

According to another aspect of the present invention, there is provided an apparatus for measuring signal strength caused by noise in a reception apparatus of a wireless communication system supporting Orthogonal Frequency Division Multiplexing (OFDM). The noise strength measurement apparatus includes an Fast Fourier Transform (FFT) unit for receiving a time-domain preamble signal by means of an OFDM frame transmitted from a transmission apparatus, and converting the time-domain preamble signal into a frequency-domain preamble signal through FFT; a noise strength measurer for measuring signal strength at each of subcarriers to which a null signal is allocated, from the frequency-domain preamble signal, and determining signal strength caused by noise depending on an average of signal strengths measured at the subcarriers. The preamble signal includes multiple subcarrier signals, and the subcarrier to which a null signal is allocated is a subcarrier over which no signal is transmitted by the transmission apparatus.

According to another aspect of the present invention, there is provided a method for measuring signal strength caused by noise in a reception apparatus of a multi-antenna system supporting Orthogonal Frequency Division Multiplexing (OFDM). The noise strength measurement method includes receiving a time-domain preamble signal via each reception antenna by means of an OFDM frame transmitted from a transmission apparatus; converting the time-domain preamble signal received via each individual reception antenna into a frequency-domain preamble signal through Fast Fourier Transform (FFT); measuring signal strength at each of subcarriers to which a null signal is allocated, from each of the frequency-domain preamble signals; calculating an average of signal strengths measured at the subcarriers; and determining signal strength caused by noise depending on an average of the averages calculated for each reception antenna. The preamble signal includes multiple subcarrier signals, and the subcarrier to which a null signal is allocated is a subcarrier over which no signal is transmitted by the transmission apparatus.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

Figure 1:
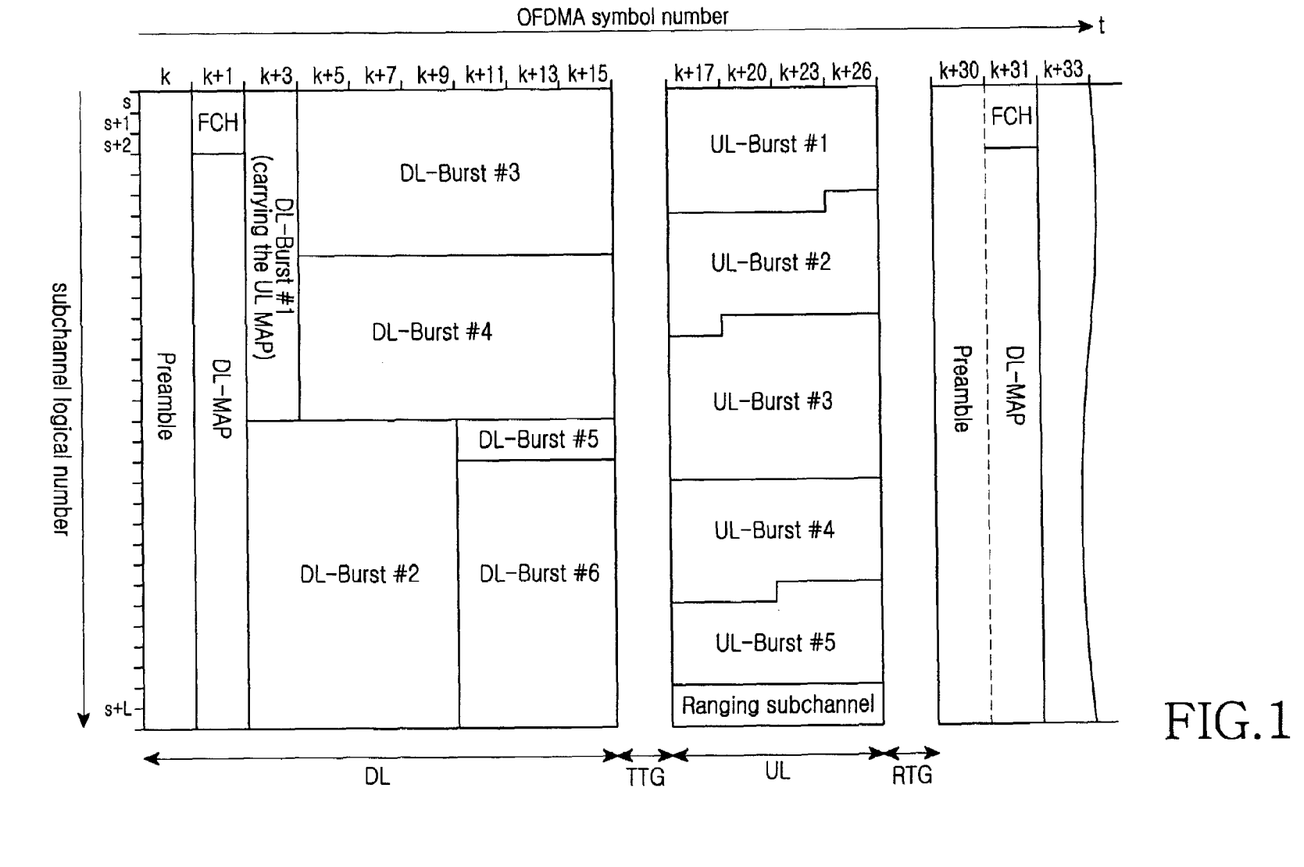
FIG. 1 illustrates a frame structure defined in a wireless communication system supporting OFDMA according to an embodiment of the present invention.

FIG. 1 illustrates a common OFDMA frame structure defined in a wireless communication system supporting OFDMA.

Referring to FIG. 1, the entire frequency band of the OFDMA frame is divided into multiple subcarriers, and a subchannel is defined by a set of the subcarriers. A time interval of one OFDMA frame has a structure in which multiple OFDMA symbols are continuously transmitted. The time interval is divided into a downlink transmission interval and an uplink transmission interval.

A signal (hereinafter referred to as a 'preamble signal') transmitted in a preamble region of the downlink transmission interval is defined for frame synchronization between a transmission apparatus and a reception apparatus. Therefore, a pattern of the preamble signal is predefined. Commonly, a form of the preamble signal has the pattern in which signals are transmitted in the subcarriers disposed at regular intervals in the entire frequency domain and no signal is transmitted in the remaining subcarriers. That is, subcarriers to which null signals are allocated are included in the frequency domain over which the preamble signal is transmitted. The subcarriers to which null signals are allocated are subcarriers corresponding to the pattern in which no signal is transmitted.

According to the present invention, the reception apparatus recognizes a pattern of the preamble signal, and measures a signal component in the remaining subcarriers except for the subcarriers over which signals are transmitted. The reception apparatus regards the measured signal component as a noise component.

Figure 2:
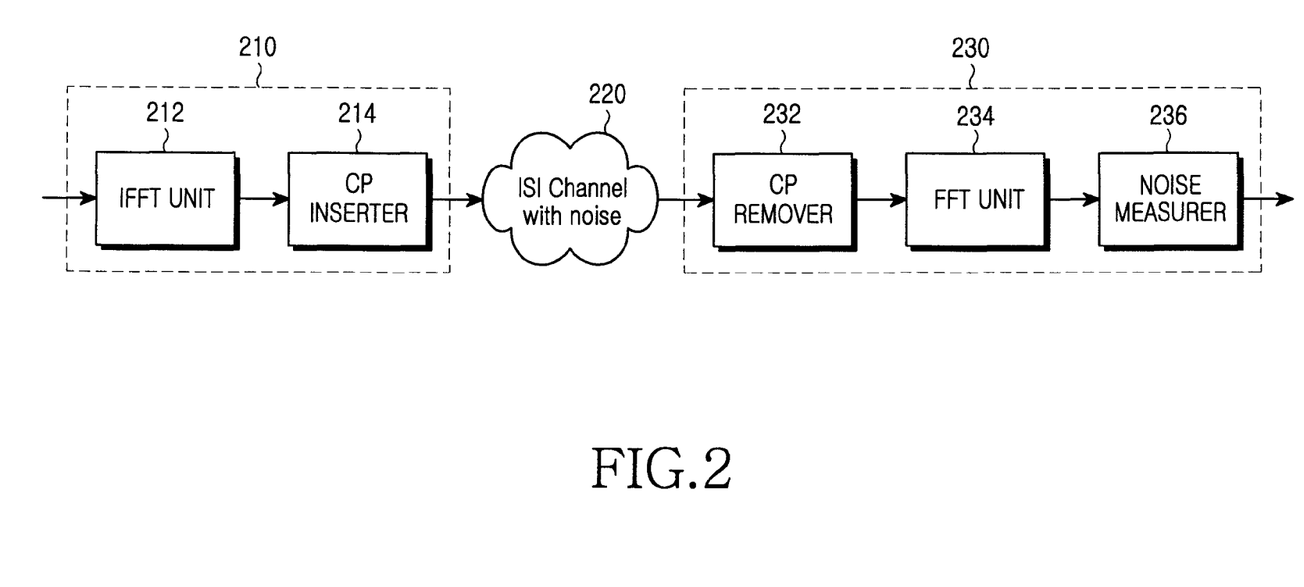
FIG. 2 illustrates a structure of a transmission/reception apparatus supporting OFDMA according to a first embodiment of the present invention.

FIG. 2 illustrates a structure of a transmission/reception apparatus supporting OFDMA according to a first embodiment of the present invention.

Referring to FIG. 2, a transmission apparatus 210 includes an Inverse Fast Fourier Transform (IFFT) unit 212 and a Cyclic Prefix (CP) inserter 214, and a reception apparatus 230 includes a CP remover 232, a Fast Fourier Transform (FFT) unit 234, and a noise strength measurer 236.

The IFFT unit 212 receives a signal sequence in the frequency domain, performs IFFT on the received signal sequence, and outputs a sample-based signal in the time domain. The number of repetitions of the sample-based signal in the time domain is determined depending on the period in which a transmission signal exists in the frequency domain. For example, when a signal is carried at periods of four subcarriers in the frequency domain, the sample-based signal undergoes four repetitions in the time domain.

Figure 3A:
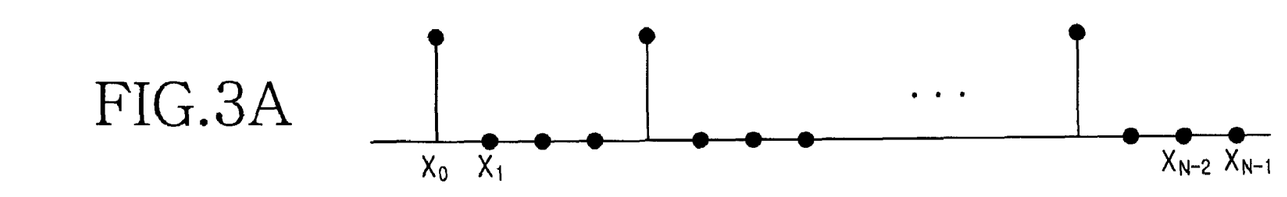
FIG. 3A illustrates a frequency-domain signal pattern in the transmission apparatus of FIG. 2.
Figure 3B:
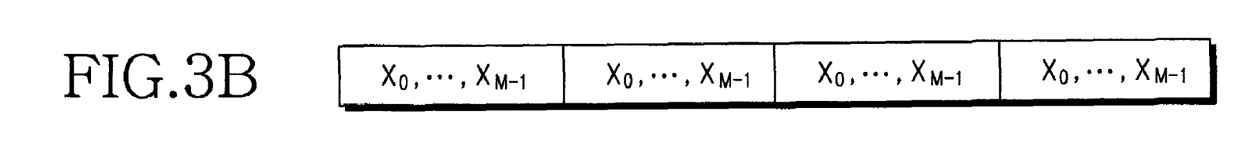
FIG. 3B illustrates a time-domain signal pattern in the transmission apparatus of FIG. 2.

Shown in FIG. 3A is an example of a signal sequence in the frequency domain. In FIG. 3A, the repetition period for which a transmission signal exists in N subcarriers is assumed to be 4. That is, if a transmission signal is carried on a first subcarrier, a transmission signal is carried on a fifth subcarrier. Shown in FIG. 3B is an example of a sample-based signal in the time domain. It is shown in FIG. 3B that M sample-based signals $x_0, \ldots, x_{M-1}$ undergo four repetitions.

A sample-based signal output from the IFFT unit 212 is provided to the CP inserter 214. The CP inserter 214 inserts a CP into the sample-based signal. The CP insertion is an operation of copying a sample-based signal with a predetermined size, presenting in front thereof, and inserting it in the back thereof. The CP-inserted signal is transmitted to the reception apparatus 230 ova a wireless channel.

Figure 3C:
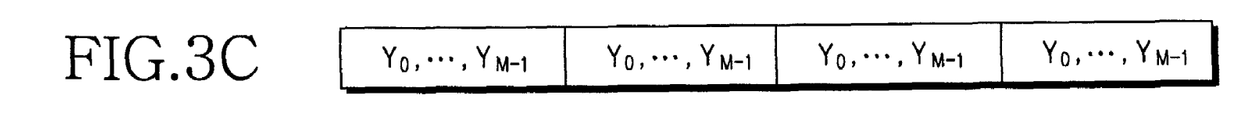
FIG. 3C illustrates a time-domain signal pattern in the reception apparatus of FIG. 2.

The CP remover 232 in the reception apparatus 230 removes a CP from the received signal. The CP-removed received signal is provided to the FFT unit 234. The time-domain received signal provided to the FFT unit 234 is expressed as FIG. 3C. The time-domain received signal has a format in which M sample-based signals $y_0, \ldots, y_{M-1}$ underwent four repetitions. The received signal includes a channel gain and a noise component in the transmitted signal.

Figure 3D:
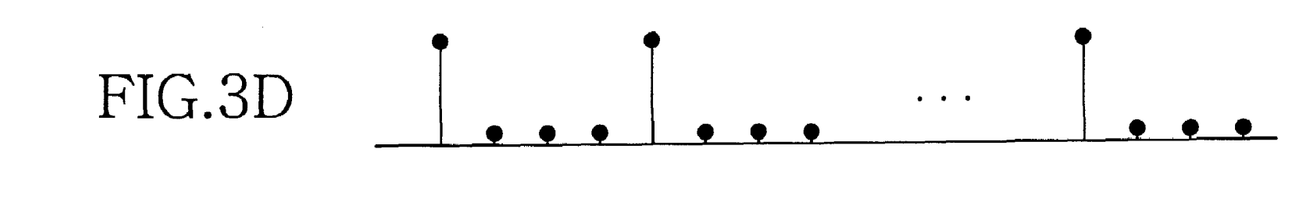
FIG. 3D illustrates a frequency-domain signal pattern in the reception apparatus of FIG. 2.

The FFT unit 234 performs FFT on the time-domain received signal, and outputs a frequency-domain received signal. The frequency-domain received signal output from the FFT unit 234 is expressed as FIG. 3D. As shown FIG. 3D, the frequency-domain received signal includes a noise component in the transmitted signal shown in FIG. 3A. Therefore, it can be noted even in FIG. 3D that a partial signal component appears in the subcarrier where no transmitted signal exists.

The noise strength measurer 236 receives the frequency-domain received signal output from the FFT unit 234. Further, the noise strength measurer 236 measures strength of a signal received in each of the remaining subcarriers except for the subcarrier where no transmitted signal exits in the frequency-domain received signal. It is assumed that the subcarrier where no transmitted signal exits is previous agreed with the transmission apparatus. The noise strength measurer 236 calculates an average of strengths of the signals measured in the subcarriers with no transmitted signal. The noise strength measurer 236 determines the calculated average of the signal strengths as a measured noise strength value.

Figure 4:
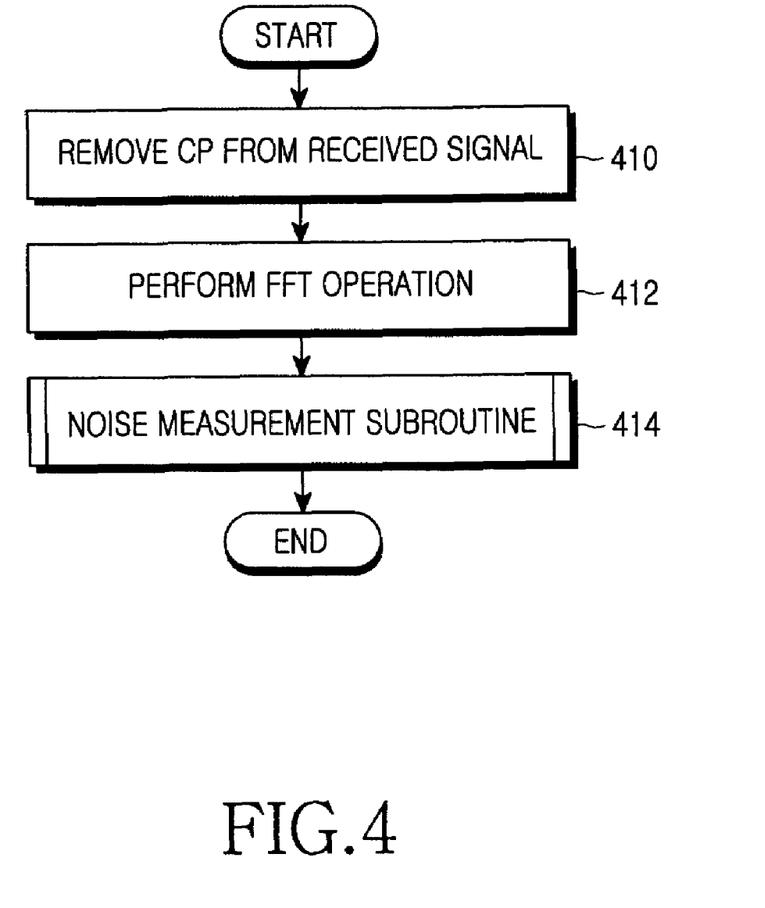
FIG. 4 illustrates a processing flow of a reception apparatus according to the first embodiment of the present invention.

FIG. 4 illustrates a processing flow of a reception apparatus according to the first embodiment of the present invention.

Referring to FIG. 4, a reception apparatus removes a CP from a received signal in step 410. Thereafter, in step 412, the reception apparatus performs an FFT operation on the CP-removed frequency-domain received signal, and outputs a time-domain received signal through the FFT operation.

In step 414, the reception apparatus performs a subroutine of measuring signal strength caused by a noise component from the time-domain received signal. In the noise strength measurement subroutine, the reception apparatus removes the subcarrier over which a signal was transmitted from the transmission apparatus. Further, the reception apparatus measures strength of the signal detected from the remaining subcarriers, and determines it as a signal strength caused by noises. As another example, the reception apparatus extracts the subcarrier over which no signal was transmitted from the transmission apparatus from the frequency-domain received signal, and measures strength of the signal detected from the extracted subcarrier. In this manner, the reception apparatus can determine the measured signal strength as a signal strength caused by noises. Alternatively, the reception apparatus can realize the noise strength measurement in units of subchannels rather than in units of subcarriers.

Figure 5:
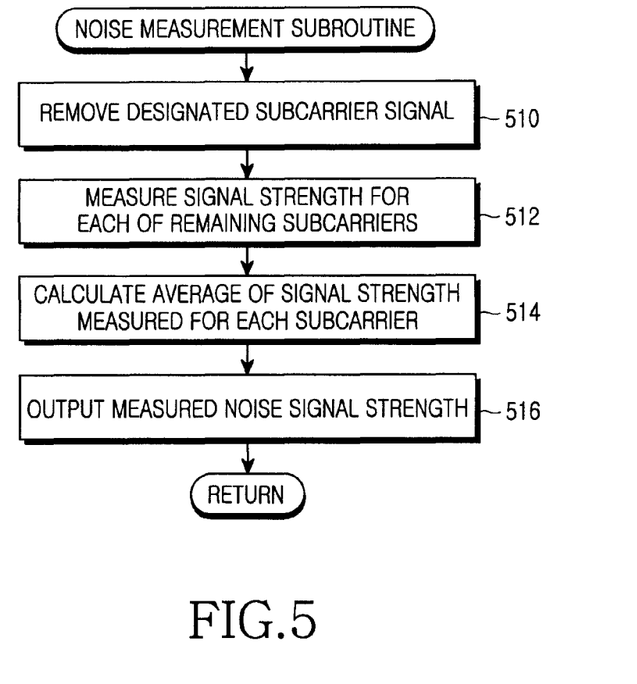
FIG. 5 illustrates a processing flow of the noise strength measurement subroutine shown in FIG. 4.

FIG. 5 illustrates a processing flow of the noise strength measurement subroutine shown in FIG. 4. The noise strength measurement subroutine shown in FIG. 5 is a procedure performed by a noise strength measurer 236 constituting the reception apparatus.

Referring to FIG. 5, the noise strength measurer 236 removes a signal of a designated frequency band in step 510. The designated frequency band corresponds to a subcarrier over which signal transmission was performed by the transmission apparatus. The frequency-domain received signal from which the signal of the designated frequency band is removed can be expressed as Equation (1).

$$Y_k = H_k X_k + W_k \quad (1)$$

where $Y_k$ denotes a received signal from which the subcarrier over which signal transmission was achieved by the transmission apparatus is removed, $H_k$ denotes a channel gain between the transmission apparatus and the reception apparatus, $X_k$ denotes a signal transmitted by the transmission apparatus, and $W_k$ denotes a noise signal. Further, k is defined as an index of the subcarrier over which no signal transmission is performed by the transmission apparatus.

Therefore, the signal $X_k$ transmitted by the transmission apparatus, as there is no signal, can be assumed as zero, so $Y_k = W_k$. In step 512, the noise strength measurer 236 measures signal strength in each of the subcarriers over which no signal transmission is carried out. In step 514, the noise strength measurer 236 calculates an average for the signal strengths measured in the subcarriers.

The noise strength measurement achieved in steps 512 and 514 by the noise strength measurer 236 can be generalized using Equation (2).

$$\eta = \text{average}|y_k|^2 \quad (2)$$

In step 516, the noise strength measurer 236 outputs the calculated average as measured noise signal strength.

As described above, the present invention measures signal strengths in the remaining subcarriers except for the subcarrier over which signal transmission is achieved in the preamble region of the OFDMA frame. Further, the present invention measures strength of a noise signal of the current channel depending on an average of the signal strength measured in each of the remaining subcarriers.

However, in the general wireless environment supporting OFDM or OFDMA, an arbitrary subcarrier signal serves as interference to an adjacent subcarrier signal. In this way, the interference by an adjacent subcarrier further increases at an adjacent subcarrier of the subcarrier where a signal is transmitted by the transmission apparatus. Therefore, each subcarrier signal where no signal is transmitted includes not only the noise component but also the interference component caused by the adjacent subcarrier signal.

A second embodiment of the present invention further considers removing an interference component caused by an adjacent subcarrier signal before measuring signal strength caused by a noise component.

Figure 6:
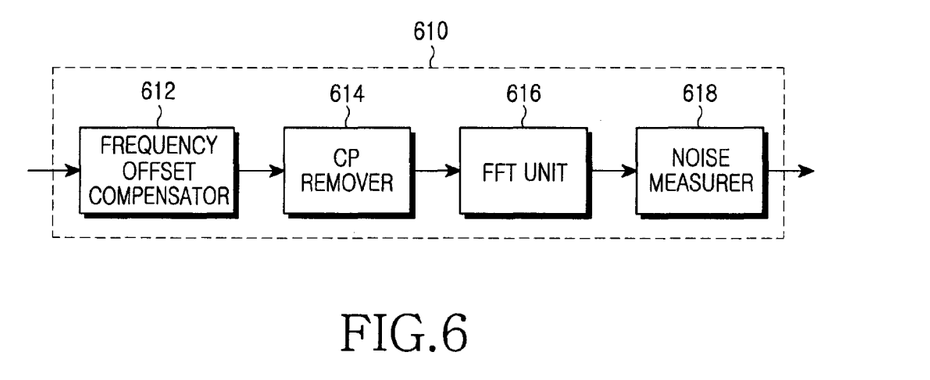
FIG. 6 illustrates a structure of a reception apparatus supporting OFDMA according to a second embodiment of the present invention.

FIG. 6 illustrates a structure of a reception apparatus supporting OFDMA according to the second embodiment of the present invention. The reception apparatus shown in FIG. 6 further includes a frequency offset compensator 612 in addition to the structure of the reception apparatus shown in FIG. 2.

The frequency offset compensator 612 removes the interference component that affects the subcarrier signal adjacent to each subcarrier signal. That is, the interference component that affects the subcarrier signal adjacent to each subcarrier has an arbitrary frequency offset rather than the normal frequency. Therefore, the frequency offset compensator 612 compensates for a frequency offset for the signal of the interference component, thereby correctly locating the signal in the subcarrier where signal transmission was performed.

The other elements and their operations except for the frequency offset compensator 612 in FIG. 6 are equal to those described with reference to FIG. 2, so a description thereof will be omitted for simplicity.

Figure 7:
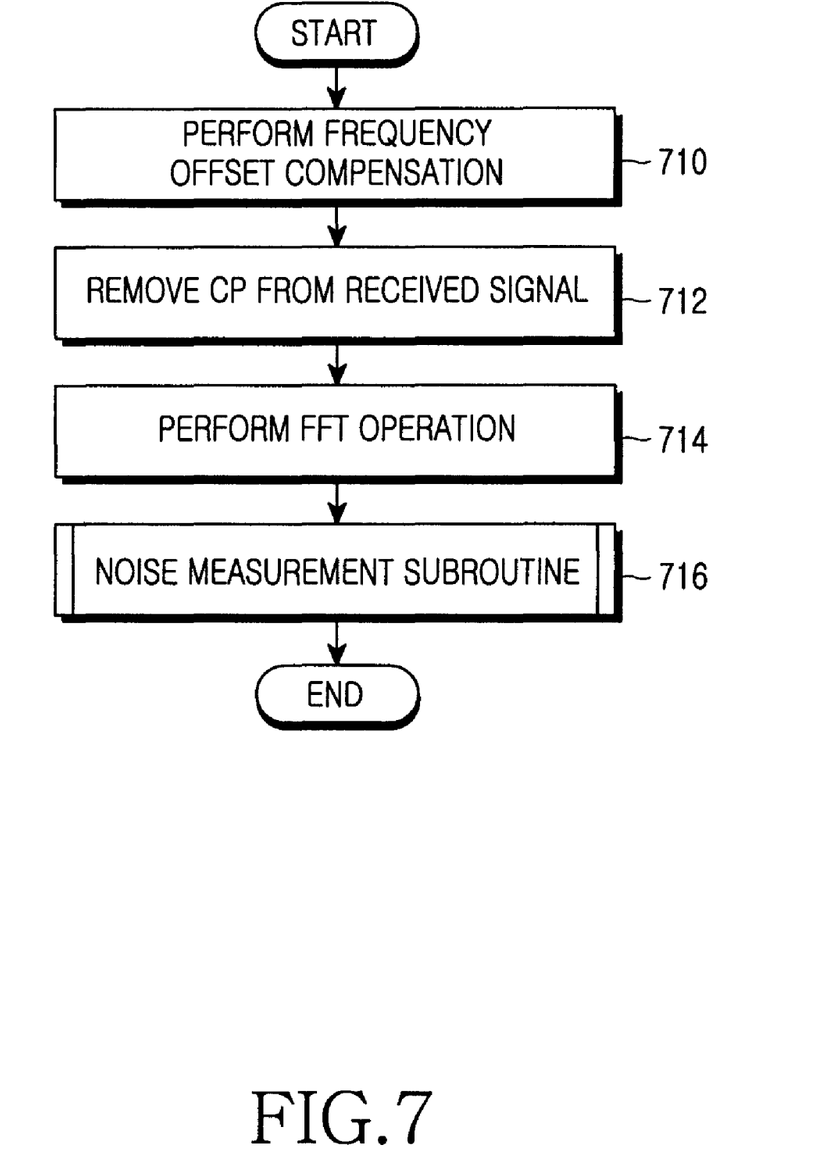
FIG. 7 illustrates a processing flow of a reception apparatus according to the second embodiment of the present invention.

FIG. 7 illustrates a processing flow of a reception apparatus according to the second embodiment of the present invention. The processing flow of FIG. 7 further includes step 710, or a process of compensating for a frequency offset, in addition to the processing flow of FIG. 4. Step 710 is performed by the frequency offset compensator 612 constituting the reception apparatus. That is, in step 710, the frequency offset compensator 612 compensates for a frequency offset occurring at each subcarrier, thereby removing the interference component that affects the subcarrier signal adjacent to each subcarrier signal. The other steps are equal to the corresponding steps of FIG. 4, so a detailed description thereof will be omitted for simplicity.

Figure 8:
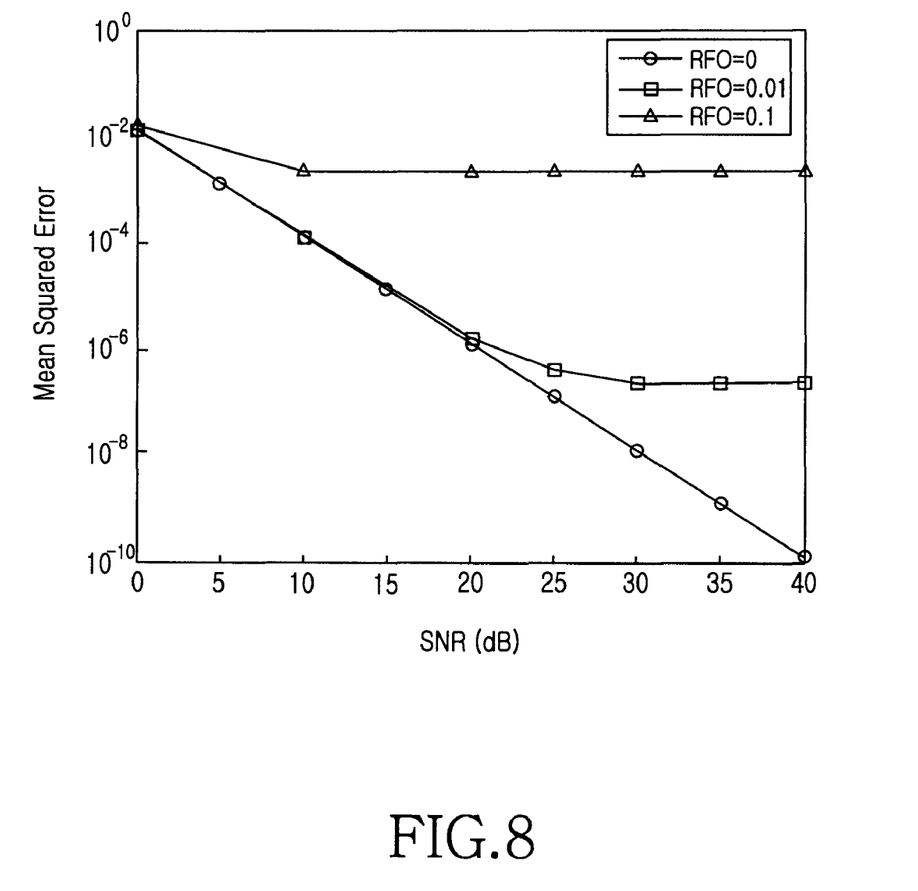
FIG. 8 illustrates performance performances of the simulation to which the first and second embodiments of the present invention are applied.

FIG. 8 illustrates performance performances of the simulation to which the first and second embodiments of the present invention are applied.

Referring to FIG. 8, when there is no Residual Frequency Offset (RFO) (RFO=0), the first and second embodiments of the present invention are equal to each other in performance. That is, a mean squared error constantly decreases in inverse proportion to an increase in a Signal-to-Noise Ratio (SNR).

However, when RFO has an arbitrary value, the mean squared error is saturated at an arbitrary point after decreasing in inverse proportion to an increase in the SNR. That is, for RFO=0.01, the mean squared error is saturated at about $10^{-6}$ at a point with SNR=25 dB, and for RFO=0.1, the mean squared error is saturated at below $10^{-3}$ at a point with SNR=10 dB.

As is apparent from the foregoing description, the present invention measures noises by means of subcarrier signals over which no signal is transmitted, in the preamble signal transmitted in an OFDM or OFDMA frame, thereby facilitating accurate noise strength measurement. In addition, the present invention measures interference by means of the subcarrier signal from which the interference caused by an adjacent subcarrier signal is removed, thereby enabling accurate noise strength measurement.

While the invention has been shown and described with reference to a certain preferred embodiment thereof, it will be understood by those skilled in the art that various changes in form and details may be made therein without departing from the spirit and scope of the invention as defined by the appended claims.

For example, the first and second embodiments of the present invention have not considered transmission antennas and reception antennas. If applied to the wireless communication system including multiple antennas, the noise strength measurement method proposed in the first and second embodiments of the present invention can be applied separately to each individual reception antenna. Further, the noise strength measurement method re-calculates an average of strength of a noise signal measured for each individual reception antenna, thereby making it possible to measure strength of the desired noise signal.

What is claimed is:

1. A method for measuring signal strength caused by noise in a reception apparatus of a wireless communication system supporting Orthogonal Frequency Division Multiplexing (OFDM), the method comprising:
   receiving a time-domain preamble signal transmitted over a plurality of subcarriers by means of an OFDM frame transmitted from a transmission apparatus;
   converting the time-domain preamble signal into a frequency-domain preamble signal through Fast Fourier Transform (FFT);
   measuring signal strength at each of subcarriers to which no signal is transmitted by the transmission apparatus, from the frequency-domain preamble signal and calculating an average signal strength based on the measured signal strength; and
   determining signal strength caused by noise based on the avenge signal strength,
   wherein the frequency-domain preamble signal has a pattern in which signals are transmitted in the subcarriers disposed at regular intervals in an entire frequency domain according to a repetition period and no signal is transmitted in remaining subcarriers.

2. The method of claim 1, further comprising:
   performing frequency offset compensation on each of subcarrier signals of the plurality of subcarriers constituting the time-domain preamble signal to remove interference caused by an adjacent subcarrier signal.

3. The method of claim 2, wherein the measuring signal strength at each of subcarriers to which no signal is transmitted by the transmission apparatus comprises:
   removing a subcarrier signal over which a signal is transmitted by the transmission apparatus, from the subcarrier signals of the plurality of subcarriers; and
   measuring the signal strength of the removed subcarrier signal.

4. The method of claim 2, wherein the average signal strength is defined as $\eta=\text{average}|Y_k|^2$, where $Y_k$ denotes strength of a subcarrier signal over which no signal is transmitted by the transmission apparatus, and k denotes an index of the subcarrier signal.

5. An apparatus for measuring signal strength caused by noise in a reception apparatus of a wireless communication system supporting Orthogonal Frequency Division Multiplexing (OFDM), the apparatus comprising:
   a Fast Fourier Transform (FET) unit for receiving a time-domain preamble signal transmitted over a plurality of subcarriers by means of an OFDM frame transmitted from a transmission apparatus, and converting the time-domain preamble signal into a frequency-domain preamble signal through FFT;
   a noise strength measurer for measuring signal strength at each of subcarriers to which no signal is transmitted by the transmission apparatus, calculating an average signal strength based on the measured signal strength, and determining signal strength caused by noise based on the average signal strength,
   wherein the frequency-domain preamble signal has a pattern in which signals are transmitted in the subcarriers disposed at regular intervals in an entire frequency domain according to a repetition period and no signal is transmitted in remaining subcarriers.

6. The apparatus of claim 5, further comprising a frequency offset compensator for performing frequency offset compensation on each of subcarrier signals of the plurality of subcarriers constituting the time-domain preamble signal to remove interference caused by an adjacent subcarrier signal.

7. The apparatus of claim 6, wherein, for measuring signal strength at each of subcarriers to which no signal is transmitted by the transmission apparatus, the noise strength measurer removes a subcarrier signal over which a signal is transmitted by the transmission apparatus, from the subcarrier of the plurality of subcarriers, and measures the signal strength of the removed subcarrier signal.

8. The apparatus of claim 6, wherein the average signal strength is defined as $\eta=\text{average}|Y_k|^2$, where $Y_k$ denotes strength of a subcarrier signal over which no signal is transmitted by the transmission apparatus, and k denotes an index of the subcarrier signal.

9. A method for measuring signal strength caused by noise in a reception apparatus of a multi-antenna system supporting Orthogonal Frequency Division Multiplexing (OFDM), the method comprising:
   receiving a time-domain preamble signal transmitted over a plurality of subcarriers via each reception antenna by means of an OFDM frame transmitted from a transmission apparatus;
   convening the time-domain preamble signal received via the each reception antenna into a frequency-domain preamble signal through Fast Fourier Transform (FFT);
   measuring signal strength at each of subcarriers to which no signal is transmitted by the transmission apparatus and calculating an average signal strength based on the measured signal strength, from the each of the the frequency-domain preamble signal; and
   determining signal strength caused by noise by calculating an average for the reception apparatus of the multi-antenna system based on the average signal strength calculated for each reception antenna, wherein the frequency-domain preamble signal has a pattern in which signals are transmitted in the subcarriers disposed at regular intervals in an entire frequency domain according to repetition period and no signal is transmitted in remaining subcarriers.

10. The method of claim 9, further comprising:

performing frequency offset compensation on each of subcarrier signals of the plurality of subcarriers constituting the time-domain preamble signal received via the each individual reception antenna to remove interference caused by an adjacent subcarrier signal.

11. The method of claim 10, wherein the measuring signal strength at each of to which no signal is transmitted by the transmission apparatus comprises:

removing a subcarrier signal over which a signal is transmitted by the transmission apparatus, from the subcarrier signals of the plurality of subcarriers; and measuring the signal strength at of the removed subcarrier signal.

12. The method of claim 9, wherein the average signal strength is defined as $\eta = \text{average}|Y_k|^2$, where $Y_k$ denotes strength of a subcarrier signal over which no signal is transmitted by the transmission apparatus, and k denotes an index of the subcarrier signal.

* * * * *